Sept. 16, 1952     W. A. VAN CAMPEN     2,610,590
DOUGHNUT CUTTER
Filed Oct. 20, 1949     2 SHEETS—SHEET 1
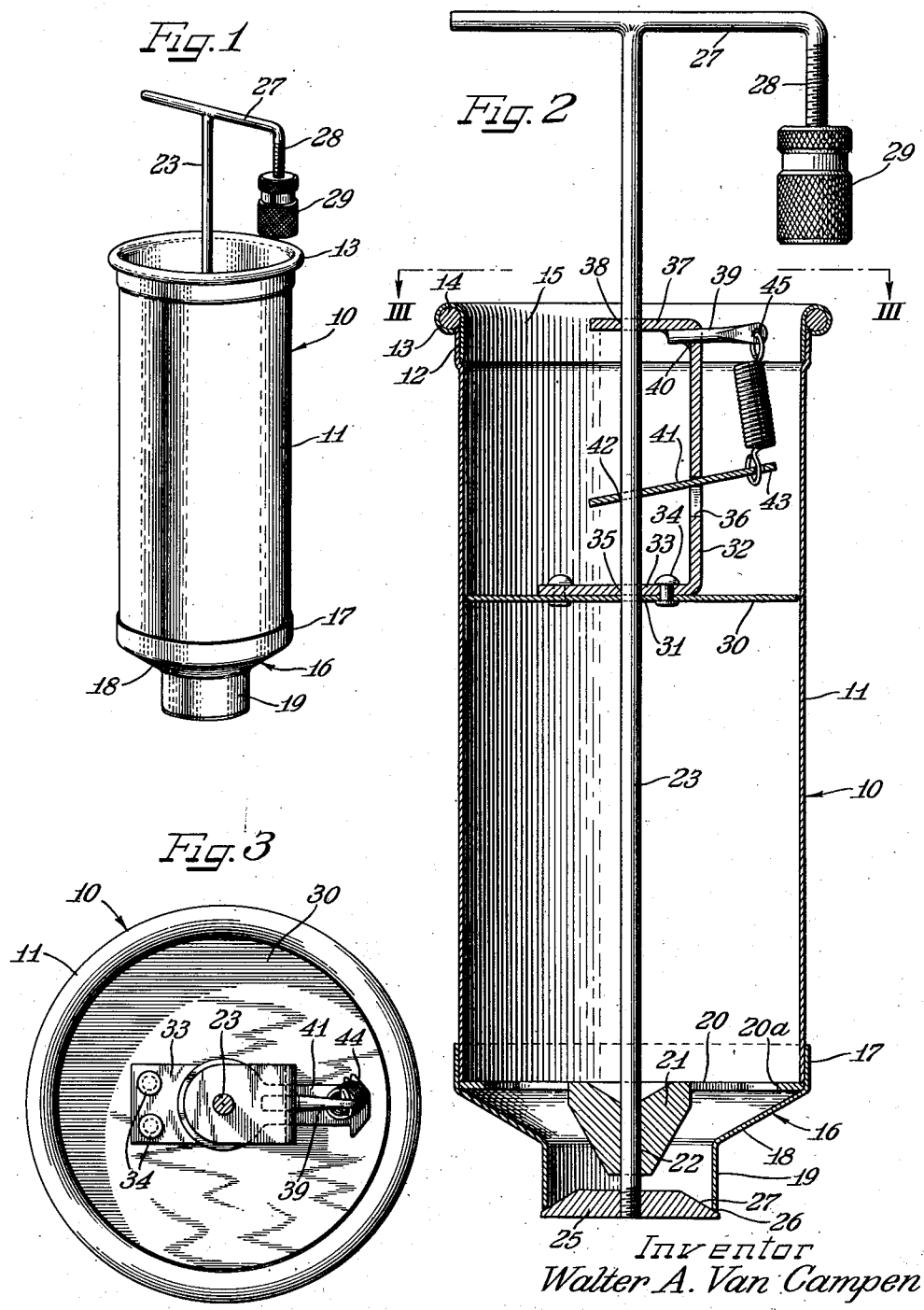
Inventor
Walter A. Van Campen

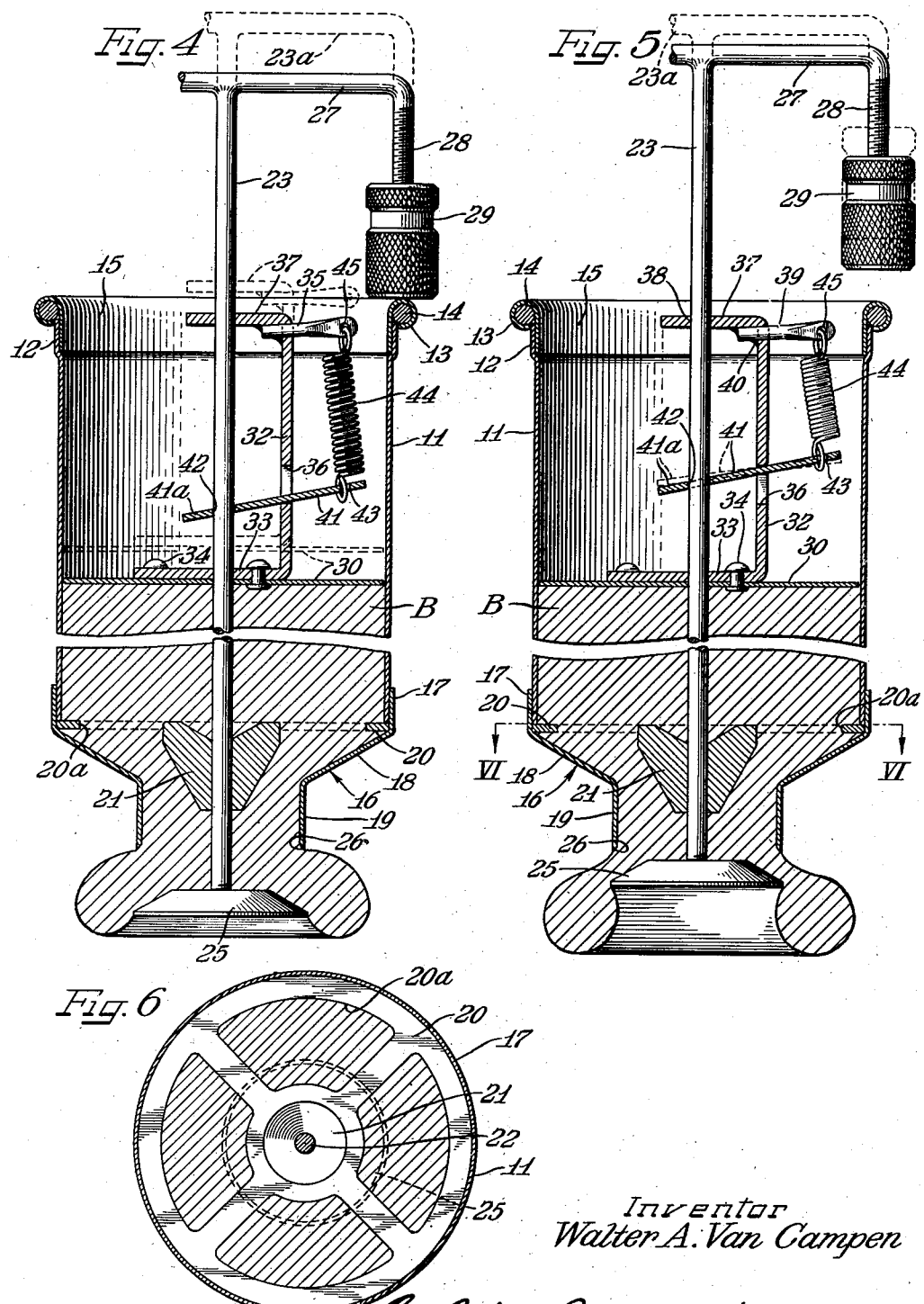

Patented Sept. 16, 1952

2,610,590

UNITED STATES PATENT OFFICE 2,610,590

DOUGHNUT CUTTER

Walter Andrew Van Campen, Chicago, Ill., assignor to Van Camp Donut System, Inc., Chicago, Ill., a corporation of Illinois Application October 20, 1949, Serial No. 122,477

8 Claims. (Cl. 107—14)

1

The present invention relates to a doughnut cutter, and more particularly to an improved form of doughnut cutter in which a variable, predetermined amount of batter is extruded through a dispensing orifice to form different sizes of doughnuts.

The improved doughnut cutter of the present invention provides an improved, inexpensive, extremely simple and readily employed means for extruding doughnut batter of a desired configuration and size. To employ the doughnut cutter, it is only necessary that the device be held over a container of hot grease or the like and that an operating rod be reciprocated within the device to dispense the preformed batter. Means are provided for adjusting the length of stroke of the operating rod so that the cutter will dispense various sizes of doughnuts through the same orifice and from the same body of batter.

In general, the cutter of the present invention includes a generally cylindrical open-ended casing having a reduced dispensing orifice at one end thereof and a reciprocal dispensing rod extending axially of the casing, the rod carrying at one end a valve for controlling the dispensing orifice. The other end of the dispensing rod carries means for determining the size of the doughnut to be dispensed from the casing, while the rod, intermediate its length, is slidably received by a bracket carrying a backing or pressure plate for contacting a body of batter within the casing.

Upon reciprocating movement of the dispensing rod, the orifice valve is alternately opened and closed to allow batter to be ejected therefrom under pressure caused by movement of the backing plate against the body of batter. Means are provided for correlating the movement of the backing plate and of the dispensing valve so that the valve is opened before pressure is applied to the body of batter to preserve the desired contour of doughnuts dispensed through the orifice and also to insure the easy operability of the device. Means are also provided for preventing lost motion during reciprocation of the dispensing rod so that the backing plate is maintained in constant contact with the body of batter within the casing during both opening and closing movement of the valve.

It is, therefore, an important object of the present invention to provide an improved doughnut cutter of simple economical design and operation.

Another important object of the present invention is to provide an improved doughnut cutter

2 in which batter is extruded through a valved opening upon movement of a backing plate exerting pressure on the batter, the valve being opened before pressure is exerted upon the batter.

It is a further important object of the present invention to provide a doughnut cutter including a valved orifice through which batter is extruded upon movement of a backing plate to exert pressure against the batter and to open the orifice, the orifice being closed without effecting movement of the plate relative to the body of batter.

Still another important object of the present invention is to provide an improved doughnut cutter including a reciprocal dispensing rod carrying a valve at one extremity for controlling an extrusion orifice and means intermediate the length of the rod for exerting pressure on a body of batter through which the rod extends, and means correlating the exertion of pressure on the batter and the opening of the valve so that the valve is opened before pressure is exerted on the batter and so that the pressure exerting means remains in contact with the batter upon reciprocation of the valve.

Other and further important objects and features of this invention will be apparent from the disclosures in the specification and the accompanying drawings.

On the drawings:

Figure 1 is an elevational, perspective view of a doughnut cutter of the present invention;

Figure 2 is a vertical sectional view, with parts shown in elevation, of the device in Figure 1;

Figure 3 is a sectional view taken along the plane III—III of Figure 2;

Figure 4 is a fragmentary sectional view, with parts shown in elevation, similar to Figure 2, illustrating one phase of operation of the device;

Figure 5 is a view similar to Figure 4 illustrating a later phase in the operation of the device; and Figure 6 is a sectional view taken along the plane VI—VI of Figure 5.

As shown on the drawings:

In Figure 1, reference numeral 10 refers generally to a doughnut cutter of the present invention including a generally cylindrical open-ended casing 11 adapted to receive a body of batter B and having its upper end 12 terminating in a radially outwardly extending lip 13 formed by a sheet metal strip lapped about an annular rod 14, the lip extending downwardly within the upper end of casing 11, as at 15.

The other end of the open end of casing 11 terminates in a casing head 16 secured thereto and including an upstanding marginal flange 17 encircling the lower open end of casing 11, a radially inwardly and downwardly sloping frusto-conical head wall 18, and a lower generally cylindrical nozzle portion 19. A spider 20, of generally circular outer contour, is secured within the casing head 16 to underlie the casing 11, the spider being segmentally apertured as at 20a and carrying a central, depending boss 21 axially apertured as at 22.

A reciprocal dispensing rod 23 is provided to extend axially of the casing 11, the rod carrying at its lower extremity a valve 25 threaded thereon and adapted to close a lower annular dispensing orifice 26 defined by the cylindrical nozzle portion 19. It should be noted that the valve 25 is provided with a frusto-conical outer seating face 27 for seating engagement with the frusto-conical terminal end surface of the nozzle portion 19 defining the orifice 26. The rod 23 is guided for reciprocatory movement by the boss 21 receiving the rod extending through the axial aperture 22. The rod is thus guided at a point closely spaced from the dispersing orifice 26.

The upper end of the valve rod 23 extends upwardly beyond the casing 11 and terminates in a horizontally disposed elongated arm 27, extending radially of the casing 11 and having a dependent end portion 28 provided with exterior threads receiving a knurled knob 29 threaded thereon. The interiorly threaded knob 29 can be moved axially along the end portion 28 of the rod 23 for a purpose to be hereinafter more fully described.

The rod 23 slidably receives, intermediate its terminal ends, a backing plate 30 having an outer diameter slightly less than the inner diameter of the casing 11, the plate 30 being centrally apertured, as at 31, to slidably receive the rod 23. A generally upwardly extending bracket 32 is secured to the backing plate 30 by suitable means, as by rivets 34, passing through a lower bracket arm 33 in flush surface contact with the upper surface of the plate 30. The lower bracket arm 33 is also apertured as at 35 for registry with the aperture 31 to receive the rod 23 therethrough. The upwardly extending central arm of the bracket 32 is provided with a generally rectangular vertically extending slot 36 for a purpose to be hereinafter more fully described. The bracket 32 has an upper horizontally extending arm 37 generally parallel to the lower leg 33 and apertured as at 38 to also slidably receive the rod 23. A separate bracket leg 39 is secured to the bracket 32 by suitable means, as by soldering or welding 40, and extends radially outwardly from the bracket and the rod 23. The bracket slot 36 receives a rod arm 41, apertured as at 42, to receive the rod 23, the rod arm 41 extending through the aperture 36 to underlie the bracket leg 39. That end of the rod arm 41 opposite the aperture 42 is apertured as at 43 to receive the lower terminal end of a coiled tension spring 44 having its other end extending through an aperture 45 formed in the corresponding end of the bracket leg 39.

The aperture 42 is of slightly greater diameter than the rod 23, the spring 44 serving to urge that end of the rod arm 41 to which it is attached upwardly, thus canting the arm 41 so that the edges of the aperture 42 are urged into surface engagement with the exterior surfaces of the rod 23. It will be seen that the rod 23 is slidably received by the registering apertures 31, 33 and 38 of the backing plate 30 and lower and upper bracket arms 33 and 37, respectively. Inasmuch as the backing plate 30 is of approximately the same outer diameter as the inner diameter of the casing 11, the backing plate 30 and the spider boss 21 serve to guide the rod 23 in a substantially vertical path when the casing 11 is held in the position shown in Figures 1 and 2 of the drawings.

The operation of the device of the present invention is as follows:

The elongated horizontal arm 27 and the guiding contact between that portion of the rod 23 adjacent the valve 27 and the guiding boss 21 insure accurate reciprocation of the handle along the axis of the casing 11 and the accurate movement of the valve 27 to open and close the orifice 26.

As best shown in Figures 4 and 5, it will be seen that upon depression of the rod 23, the knob 29 will be brought into contact with the upper lip 13 of casing 11. The casing thus limits the movement of the rod 23 and it is evident that the distance through which the rod may be moved is readily determinable by the positioning of the knob 29 upon the dependent arm 28 of the rod. Thus, to vary the distance through which the valve 25 is opened and the amount of batter B extruded through the orifice 26, it is only necessary to threadedly adjust the position of the knob 29 with respect to the rod 23.

It will also be seen that upon depressing movement of the rod 23, the rod will be capable of relative movement with respect to the bracket 32 slidably receiving the rod. However, the spring 44 urges the outer end of the rod arm 41 upwardly to cause gripping engagement between the edges of the rod arm aperture 42 and the rod 23. The rod, when depressed, thus carries with it the rod arm 41 through the length of the slot 36. This movement of the rod serves to open the valve 25 a predetermined distance, namely, a distance equal to the depth of the slot 36, prior to any movement of the backing plate 30.

After the arm 41 is bottomed in the slot 36, further movement of the rod 23 causes a corresponding movement of the backing plate 30 and the extension of pressure upon the body of batter B disposed within the casing 11. The backing plate 30, following the bottoming of the arm 41 within the groove 36, is thus moved downwardly within the casing through the remaining distance of movement of the depending rod 23, the pressure thus exerted upon the body of batter B extruding the batter through the open orifice 26. The valve 25 below the orifice 26 forces the extruded body of batter to flow outwardly around the valve, thus shaping the batter to a circular, dished configuration. Since the valve 25 has been opened prior to the subjection of the batter B to any pressure, the batter can flow freely through the opened orifice 26 under pressure to assume the configuration shown in Figure 4.

In Figure 5, the device 10 is depicted as the rod 23 is being moved upwardly for the next dispensing stroke. It will be seen that upon the upward movement of the rod, the arm 41 travels with the rod through a distance equal to the depth of the slot 36 until the arm 41 rests against the upper extremity of the lot. At this time, further movement of the rod upwardly tilts the arm 41 to the dotted position 41a releasing the rod from its gripping engagement with the arm 41, the tension spring 44 accommodating this tilting movement of the arm 41. The rod 23 is thus being moved to its dotted position 23a at the height of this dispensing stroke to close the valve 25 without causing any movement whatsoever of the backing plate 30 from the dispensing position shown in Figure 4.

It will thus be seen that the resilient tension spring 44, together with the apertured rod arm 41, prevents the opening of the valve 45 prior to the exertion of pressure upon the plate 30 and also permits upward movement of the rod 23 to begin the next depending stroke without movement of the backing plate 30 from contact with the batter B. It will also be appreciated that the spring 44 is extended upon the dispensing downward stroke of the rod in the position shown in Figure 4 to maintain the arm 41 in tilted position relative to the rod 23.

It will, of course, be understood that various details of construction may be varied through a wide range without departing from the principles of this invention, and it is, therefore, not the purpose to limit the patent granted hereon otherwise than necessitated by the scope of the appended claims.

I claim as my invention:

1. An apparatus for extruding doughnuts comprising a casing having an opening at one end and adapted to receive a quantity of batter, a valve for closing said opening at said one end of said casing, a rod for effecting movement of said valve, a backing plate movable within said casing for exerting pressure on said batter and slidably receiving said rod, a bracket carried by said plate and slidably receiving said rod, means slidably carried by said bracket and said rod for grippingly engaging said rod upon movement of the same to open said valve, and a lost-motion linkage between said last-mentioned means and said bracket for accommodating movement of said rod to open said valve a predetermined distance before causing movement of said plate to exert pressure upon said batter.

2. An apparatus for extruding doughnuts comprising a casing having an opening at one end and adapted to receive a quantity of batter, a valve rod extending axially from the casing and movable therein, a valve carried by said rod for closing said opening at said one end of said casing, a backing plate slidably receiving said rod intermediate its length, a bracket secured to said plate and slidably receiving said rod, a lost-motion rod arm connected to said bracket and said rod, and resilient means interposed between said bracket and said arm for causing controlled movement of said plate with said rod for a portion of the distance of movement of said rod while accommodating initial limited relative movement therebetween to open said valve prior to movement of said plate.

3. An apparatus for extruding doughnuts comprising a casing having an opening in one end thereof and adapted to receive a quantity of batter, a valve closing said opening at said one end of said casing, a rod extending through the casing for actuating said valve, a movable backing plate carried by said rod for exerting pressure on the batter, an upwardly extending bracket secured to said plate and movable therewith, said bracket having an elongated slot formed therein extending in the direction of movement of said rod, a rod arm slidably receiving said rod and extending through said aperture, and resilient means carried by said bracket for urging said rod arm into gripping engagement with said rod upon movement of said rod to open said valve, whereby movement of said rod through a predetermined distance relative to said plate to open said valve is accommodated by said slot with further movement of said rod causing a corresponding movement of said plate to exert pressure upon said body of batter to extrude the same from said casing about said open valve.

4. An apparatus for extruding doughnuts comprising a casing having an opening at one end thereof and adapted to receive a quantity of batter, a valve for closing said opening at said one end of said casing, a rod extending through said casing for actuating said valve, a movable backing plate slidably carried by said rod for exerting pressure on said batter, a bracket carried by said backing plate, a rod arm slidably receiving said rod, and resilient means carried by said bracket for accommodating movement of said rod relative to said plate for a predetermined distance, the rod arm contacting said bracket following said movement through said distance to cause a corresponding movement of said backing plate upon further movement of the said rod.

5. An apparatus for extruding doughnuts comprising a casing having an opening in one end thereof and adapted to receive a quantity of batter, a valve controlling said opening in said one end of said casing, a valve actuating rod, a backing member for exerting pressure on the batter, and means accommodating closing of said valve without effecting movement of said pressure exerting means, said last mentioned means including a rod arm carried by said backing member and slidably receiving said rod, and resilient means normally urging said arm into gripping engagement with said rod and accommodating tilting movement of said arm from its normal position relative to said rod to slidably accommodate valve closing movement of said rod without corresponding movement of said arm.

6. In an apparatus for extruding doughnuts including a casing having an opening in one end thereof and adapted to receive a quantity of batter, valve means for closing said opening in said one end of the casing, a rod for actuating the valve and a movable backing plate carried by the rod for exerting pressure on the batter, means for correlating movement of said valve and said backing plate comprising a rod arm apertured to slidably receive said rod, resilient means tilting said rod arm into gripping engagement with said rod, and means carried by said backing plate for accommodating movement of said rod and said rod arm through a predetermined distance to open said valve without causing movement of said backing plate and the exertion of pressure upon said batter.

7. In an apparatus for extruding doughnuts including a casing having an opening in one end thereof and adapted to receive a quantity of batter, a valve for closing said opening in said one end of the casing, a rod extending through the casing for actuating the valve and a movable backing plate carried by the rod for exerting pressure on the batter, means correlating movement of said valve and said backing plate comprising a rod arm slidably receiving the rod and tiltable into gripping engagement with said rod during movement of the rod to open said valve, and means carried by said backing plate for causing movement of said rod arm from gripping engagement with said rod upon return movement of the rod from its position at which said valve is open to permit closing movement of the valve without effecting movement of the backing plate.

8. An apparatus for extruding batter, comprising a casing for containing batter and having an opening therein, a valve for controlling said opening, a rod for effecting movement of said valve, a backing plate movable within said casing for exerting pressure on the batter in said casing, a bracket carried by said backing plate, means slidably carried by said rod for grippingly engaging said rod on movement of the same to open said valve, and a lost-motion linkage between said last-mentioned means and said bracket operative to accommodate movement of said rod to open said valve a predetermined distance before effecting movement of said backing plate to exert pressure upon said batter.

WALTER ANDREW VAN CAMPEN.

REFERENCES CITED

The following references are of record in the file of this patent:

UNITED STATES PATENTS

| Number | Name | Date |
| --- | --- | --- |
| 1,397,510 | Grassi | Nov. 22, 1921 |
| 2,148,774 | Petzelt | Feb. 28, 1939 |
| 2,416,470 | Cottingham | Feb. 25, 1947 |
| 2,507,254 | Jones | May 9, 1950 |